United States Patent Office 2,835,688
Patented May 20, 1958

2,835,688

PREPARATION OF FLUID POLYVALENT METAL PHENATES

William M. Le Suer, Euclid, Ohio, assignor to The Lubrizol Corporation, Wickliffe, Ohio, a corporation of Ohio No Drawing. Application January 4, 1954
Serial No. 402,135

13 Claims. (Cl. 260—429.9)

This invention relates to lubricants which are of particular use in airplane engines. In a more particular sense it relates to additives which are useful in such lubricants, and to a novel process by which these additives may be prepared. The additives which are the products of this novel process are the polyvalent metal salts of phenolic organic compounds, which phenolic compounds contain a total of at least 10 carbon atoms. Preferred are alkyl phenols wherein the substituent alkyl group or groups on each benzene nucleus contain a total of at least 10 carbon atoms.

The preparation of zinc and magnesium salts of high molecular weight alkylated phenolic organic compounds has been accomplished most conveniently in the past by means of processes which yielded solutions of these salts in organic solvents such as; e. g., alcohols. In the case of zinc salts of these compounds, the preparation has generally been effected by means of a double decomposition reaction involving the sodium salt of the alkylated phenolic organic compound and a zinc salt such as zinc chloride. This double decomposition is carried out conveniently in an organic solvent such as methanol, butanol, etc. and sodium chloride is precipitated, leaving an organic solution of the zinc salts of the alkylated phenolic organic compounds. In the case of magnesium salts of these compounds, their preparation has generally been effected by means of reaction of the alkylated phenolic organic compound with a magnesium alcoholate dissolved in the same organic solvent. The organic solvent is usually an alcohol. Again this yields an organic solution of the desired salt.

Isolation of these salts from their organic solutions has been accomplished by concentration of the solution by distilling the solvent therefrom. This process is notably inconvenient because of the extreme viscosity of the residue from said concentration. The residue is so viscous as to be unfilterable and generally quite unmanageable. In addition, the residual magnesium or zinc salt frequently is heterogeneous and tends to agglomerate into lumps. Furthermore, the salt prepared in this fashion frequently is not permanently soluble, if at all soluble, in the mineral oil in which it is intended for use as an additive.

Prior art workers have attempted to solve these problems by incorporating solubilizing agents and substantial proportions of inert solvents such as mineral oils. However, such attempts have not been uniformly successful and have the disadvantage of reducing the concentration of the product. The process of the present invention requires neither solubilizers nor inert solvents for its success and can be carried out in such a manner as to yield a concentrated product.

It is accordingly a principal object of this invention to provide a novel process for the preparation of polyvalent metal salts of high molecular weight phenolic organic compounds. It is another object to provide such a process whereby the above products are prepared in a homogeneous relatively non-viscous, and permanently oil-soluble form.

Other objects will be apparent from the details of the ensuing description.

To the accomplishment of the foregoing and related ends, said invention, then, comprises the features hereinafter fully described and particularly pointed out in the claims, the following description setting forth in detail certain illustrative embodiments of the invention, these being indicative, however, of but a few of the various ways in which the principle of the invention may be employed.

In accordance with the principles of the invention the process of isolating polyvalent metal salts of high molecular weight alkylated phenolic organic compounds from solutions in organic solvents has been improved such that products of improved fluidity and oil-solubility are readily available therefrom.

Broadly stated, the invention relates to a method for producing a fluid, oil-soluble polyvalent metal salt of a phenolic compound, which phenolic compound contains a total of at least 10 carbon atoms, which process comprises the steps of:

(a) Preparing a solution of the polyvalent metal salt of the phenolic compound in an organic solvent;

(b) Evaporating a substantial proportion of the organic solvent from such solution at a temperature below the decomposition temperature of said polyvalent metal salt; and (c) Reacting with the resulting material from 0.1 to 2.5 moles of water per mole of polyvalent metal salt present.

The polyvalent metal salts referred to above include chiefly the magnesium and zinc salts. Other polyvalent metal salts are likewise considered within the scope of this invention and such salts include the barium, calcium, strontium, manganese, cadmium, aluminum, lead, iron, cobalt, etc. salts although the magnesium and zinc salts are preferred.

Phenolic organic compounds may be defined as including all organic compounds having at least one hydroxyl group attached directly to a benzenoid carbon which may be part of a single or fused ring, and which compounds may or may not have other substituents on the benzenoid nucleus. However, it is preferred to utilize such phenolic organic compounds which have but one phenolic hydroxyl group; i. e., a hydroxyl group which is attached directly to a carbon atom of a benzenoid nucleus. Thus phenolic organic compounds include such compounds as phenols and naphthols, and their substitution products, such as chlorinated phenols, chlorinated naphthols, phenol sulfides, and the like. Such phenolic organic compounds, as utilized in the process of this invention, will generally also have present within their molecular structure at least one aliphatic chain. For reasons of oil-solubility, such aliphatic chain substituents should contain a total of at least about 10 carbon atoms, and in the preferred instance at least about 20 carbon atoms. Usually the total number of carbon atoms in such aliphatic substituents will not be more than 30, although they may contain as high as 60 carbon atoms. Preferably, the aliphatic chain substituents are hydrocarbon in nature, and most usually alkyl groups, because of their ready availability; however, other aliphatic substituents are suitable, for example, alkoxy groups. In many instances the hydrocarbon chain is derived from a polyisobutylene, and it is preferred to utilize an alkylated phenolic compound which contains at least one polyisobutyl radical derived from a polyisobutylene having an average molecular weight of 250–350. Polyisobutylene fractions within the average molecular weight range are available from the Indoil Chemical Company under the trade name "Indopol L-10," stated to have a molecular weight of 300–330.

Broadly speaking, the organic solvent may be any organic solvent in which the polyvalent metal salt of the phenolic organic compound is soluble without decomposition. Suitable solvents would include, e. g., hydrocarbon solvents and oxygen-bearing solvents such as ketones, aldehydes, ethers, esters and alcohols. By virtue of their cheapness and suitability, alcohols are preferred for the purposes of this invention.

The nature of the alcohol used in preparing a solution of the polyvalent metal salt of the phenolic organic compound is of some importance. In view of the fact that removal of the alcohol from the reaction mass by evaporation is contemplated, low-boiling or low molecular weight $C_1$–$C_7$ alcohols are preferred. Thus, such alcohols as methyl, ethyl, n-propyl, isopropyl, n-butyl, sec-butyl, isobutyl, tert-butyl, n-amyl, iso-amyl, 2-methyl pentyl-4, etc. are illustrative.

The step of concentrating the process mass comprising alcohol and a polyvalent metal salt of a phenolic organic compound is accomplished by evaporation for a period of time sufficient to remove a substantial amount of alcohol. Usually the alcohol will be distilled from the solution until no more distills. An additional period of heating at diminished pressure will remove some more alcohol. The time required for removing this alcohol will be usually at least 0.25 hour, and more usually at least 0.5 hour. At this point the concentrated mass is a viscous, oil-insoluble, and generally unworkable material. It cannot be filtered and it frequently is of a lumpy consistency. The addition of a small quantity of water transforms this viscous, oil-insoluble, lumpy mass into a relatively fluid, permanently oil-soluble, homogeneous liquid. Filtration of the material after water treatment is rapid and convenient.

The manner in which the water-treatment operates to improve the physical properties of the above-described metal salts is not known. It is quite possible that a portion of the alcohol is bound in some way to the polyvalent metal phenate and that the addition of water releases this bound alcohol. In such a case the high viscosity, oil-insolubility, etc. would appear to be caused by said bound alcohol, although this phenomenon is not understood.

The amount of water which may be used in the process described herein is a significant factor in the optimum operability thereof. Although the addition even of a trace of water has a noticeably beneficial effect upon the physical properties of the polyvalent metal phenates, it is preferred to add at least an amount which is equivalent to 0.10 mole per mole of the polyvalent metal present as the salt. In the usual practice of the invention, one mole of water is used per mole of polyvalent metal salt. It is advisable not to use an excessive amount of water in view of the observation that such an excessive amount appears to decompose the polyvalent metal phenate. Thus, amounts of water in substantial excess of 2.5 moles per mole of polyvalent metal are preferably avoided.

The process mass containing alcohol and magnesium salts of phenolic organic compounds are prepared usually by reaction of a particular magnesium alcoholate with the phenolic organic compound in the presence of the corresponding alcohol. The resulting reaction mixture is then available for utilization as a starting material in the process described herein.

Mixtures of alcohol and zinc salts of phenolic organic compounds are prepared usually by a double decomposition reaction of zinc chloride with an alcohol solution of an alkali metal salt of the particular phenolic organic compound. The resulting reaction mixture is filtered to remove solid alkali metal halide and the filtrate is available as a starting material for use in the process of this invention.

Mixtures of various polyvalent metal salts of alkylated phenolic organic compounds may be prepared according to the process whereby an alcoholic solution of a mixture of polyvalent metal salts of alkylated phenolic organic compounds is concentrated and then treated with water.

It has been observed furthermore that the process of water-treatment is applicable not only to the normal, or neutral polyvalent metal salts, but also to the basic salts as well. In some instances, it may be convenient to carry out the process in a stepwise manner by first preparing the normal metal salt of the alkylated phenolic organic compound, treating it with water, adding an excess of the desired metal alcoholate thereto, and treating with water a second time. In other instances, the basic metal salt of the alkylated phenolic organic compound may be first prepared and then treated with water.

The following examples serve to illustrate the invention in more specific detail.

Example 1

This example illustrates the result obtained omitting the water treatment step of this invention. The product is unsatisfactory.

Magnesium methylate was prepared by adding 9.75 grams (0.4 mole) of magnesium in half gram portions to 180 ml. of refluxing methanol. The addition required an hour, after which 283 grams (0.8 mole) of cetyl phenol and 438 grams of mineral oil was added and the whole was heated at reflux temperature for 1.5 hours. Methanol was removed by heating to a final temperature of 85° C. at diminished pressure (water aspirator). The residue was a very viscous oil-insoluble liquid and could not be filtered satisfactorily.

The remaining examples illustrate the process of the invention.

Example 2

One mole of magnesium methylate was prepared as above and heated at reflux temperature for 1.5 hours with 884 grams (2.0 moles) of octadecyl phenol and 908 grams of mineral oil. The resulting mixture was concentrated by heating to a final temperature of 75° C. at diminished pressure (water aspirator). The residue was quite viscous. A 228-gram sample was heated with 2.0 grams of water at 135° C. for 35 minutes. The resulting product was much less viscous, could be filtered easily, and was oil-soluble. Further experiments with the remainder of the residue obtained above indicated that while 0.25 mole of water per mole of magnesium methylate had a slight beneficial effect on the viscosity, 0.5 mole of water per mole of magnesium methylate had a very appreciable effect.

Example 3

To one mole of magnesium methylate prepared as in Example 1, there was added 1084 grams (2.0 moles) of polyisobutyl-substituted phenol (containing an average of 32 aliphatic carbon atoms per molecule) and 1108 grams of mineral oil and the resulting mixture was heated at reflux temperature for 1.5 hours. The methanol was removed by heating to 75° C. at diminished pressure (water aspirator) yielding as a residue a thick, viscous liquid which could not be filtered conveniently. Treatment of this mass with 10 grams of water resulted in a fluid, easily filterable, non-viscous, oil-soluble product.

Example 4

To 1.14 moles of magnesium methylate prepared as in example 1, there was added 820 grams (2.28 moles) of dodecyl phenol and 1267 grams of mineral oil and the whole was stirred at reflux temperature for 1.5 hours. Thereupon methanol was removed by distillation at reduced pressure to yield a liquid residue of such viscosity that the glass stirrer was broken. Addition of 10 grams of water caused a marked reduction in viscosity such that the product could be filtered with ease. The filtrate was fully oil-soluble.

Example 5

A mole of water-treated magnesium octadecyl phenate was prepared as in Example 2 and added to a mole of magnesium methylate in 145 ml. of methanol. This mixture was heated at reflux temperature for 1.5 hours, then concentrated by heating to 60° C./50 mm. The residue, which weighed 871 grams, was treated with 4.0 grams of water to yield a fluid, clear, oil-soluble product which, upon analysis, was found to contain twice the amount of magnesium present in the normal magnesium octadecyl phenate.

Example 6

Two moles of sodium methylate was prepared by adding the theoretical amount of sodium metal to 620 ml. of methanol, and then mixed with 714 grams (2.0 moles) of octadecyl phenol and 1168 grams of mineral oil. This mixture was heated at reflux temperature for 1.5 hours. To this mixture was added a solution of 136 grams (1.0 mole) of zinc chloride in 300 ml. of methanol and the resulting mixture was heated at reflux temperature for 1.5 hours, and then concentrated to a viscous mass by heating to a final temperature of 120° C./30 mm. Nine grams of water was added and the product again heated to 120° C./20 mm., then filtered through "Hyflo." The filtrate was clear, fluid, and oil-soluble.

Example 7

Sodium methylate was prepared by the portionwise addition of 6.9 grams (0.3 mole) of sodium to 93 ml. of methanol and then mixed and heated at reflux temperature for 1.5 hours with 510 grams (0.3 mole) of polyisobutyl-substituted phenol and 778 grams of mineral oil. To this mixture was added a solution of 20.5 grams (0.3 equivalent) of zinc chloride in 300 ml. of methanol and the resulting mixture was heated at reflux temperature for 1.5 hours. The product was concentrated to a viscous mass by heating to 120° C./38 mm. and this residue after treatment with 5.9 grams of water, was again heated to 125° C./38 mm. The non-viscous material was filtered through "Hyflo" to yield an oil-soluble, fluid product.

Example 8

To sodium methylate prepared by the portionwise addition of 7.7 grams (0.33 mole) of sodium to 103 ml. of methanol there was added 561 grams (1.0 mole) of polyisobutyl-substituted phenol and the mixture was heated for 1.5 hours at reflux temperature. To this mixture was added a solution of 22.7 grams (0.33 equivalent) of zinc chloride in 150 ml. of methanol and the whole was heated at reflux temperature for 1.5 hours. Excess methanol was removed by distillation and final heating to 120° C./38 mm. To the viscous residue was added a solution of magnesium methylate (0.67 equivalent) in 150 ml. of methanol and this mixture was heated again at reflux temperature for an additional 1.5 hours, then concentrated to a viscous residue by heating to a final temperature of 110° C./35 mm. Nine grams of water was added to this residue and it was again heated to 120° C./35 mm. The material was filtered through Hyflo to yield a non-viscous filtrate which was oil-soluble. It contains both the magnesium and zinc phenates of polyisobutyl-substituted phenol.

Other modes of applying the principle of the invention may be employed, change being made as regards the details described, provided the features stated in any of the following claims, or the equivalent of such, be employed.

I therefore particularly point out and distinctly claim as my invention:

1. A method for producing fluid, oil-soluble polyvalent metal salts of a phenolic compound, which phenolic compound contains a total of at least 10 carbon atoms and less than 60 aliphatic carbon atoms, which process comprises the steps of: (a) preparing a solution of at least one polyvalent metal salt of the phenolic compound in an organic solvent, said polyvalent metal salt selected from the class consisting of magnesium, zinc, barium, calcium, strontium, manganese, cadmium, aluminum, lead, iron, and cobalt salts; (b) evaporating substantially all of said organic solvent from such solution at a temperature below the decomposition temperature of said polyvalent metal salt; and (c) reacting with the resulting material from 0.1 to 2.5 moles of water per mole of polyvalent metal salt present.

2. A method for producing fluid, oil-soluble polyvalent metal salts of a phenolic compound which phenolic compound contains a total of at least 10 carbon atoms and less than 60 aliphatic carbon atoms, which process comprises the steps of: (a) preparing a solution of at least one polyvalent metal salt of the phenolic compound in an alcohol, said polyvalent metal salt selected from the class consisting of magnesium, zinc, barium, calcium, strontium, manganese, cadmium, aluminum, lead, iron, and cobalt salts; (b) evaporating substantially all of said alcohol from such solution at a temperature below the decomposition temperature of said polyvalent metal salt; and (c) reacting with the resulting material from 0.1 to 2.5 moles of water per mole of polyvalent metal salt present.

3. A method for producing fluid, oil-soluble polyvalent metal salts of a phenolic compound, which phenolic compound contains a total of at least 10 carbon atoms and less than 60 aliphatic carbon atoms, which process comprises the steps of: (a) preparing a solution of at least one polyvalent metal salt of the phenolic compound in an alcohol of less than 8 carbon atoms, said polyvalent metal salt selected from the class consisting of magnesium, zinc, barium, calcium, strontium, manganese, cadmium, aluminum, lead, iron and cobalt salts; (b) evaporating substantially all of said alcohol of less than 8 carbon atoms from such solution at a temperature below the decomposition temperature of said polyvalent metal salt until a viscous material results; and (c) reacting with the resulting material from 0.1 to 2.5 moles of water per mole of polyvalent metal salt present.

4. The process of claim 3 further characterized in that said phenolic compound contains at least 10 aliphatic carbon atoms per benzene nucleus.

5. The process of claim 3 further characterized in that said phenolic compound contains at least one polyisobutylene substituent having an average of from 10 to 60 carbon atoms.

6. A method for producing a fluid, oil-soluble magnesium salt of a phenolic compound, which phenolic compound contains a total of at least 10 carbon atoms and less than 60 aliphatic carbon atoms, which process comprises the steps of: (a) preparing a solution of the magnesium salt of the phenolic compound in an alcohol of less than 8 carbon atoms; (b) evaporating a substantial proportion of the alcohol of less than 8 carbon atoms from such solution at a temperature below the decomposition temperature of said magnesium salt until a viscous material results; and (c) reacting with the resulting material from 0.1 to 2.5 moles of water per mole of magnesium salt present.

7. The process of claim 6 further characterized in that said phenolic compound contains at least ten aliphatic carbon atoms per benzene nucleus.

8. The process of claim 6 further characterized in that said phenolic compound contains at least one polyisobutylene substituent having an average of from 10 to 60 carbon atoms.

9. A method for producing a fluid, oil-soluble zinc salt of a phenolic compound, which phenolic compound contains a total of at least 10 carbon atoms and less than 60 aliphatic carbon atoms, which process comprises the steps of: (a) preparing a solution of the zinc salt of the phenolic compound in an alcohol of less than 8 carbon atoms; (b) evaporating a substantial proportion of the alcohol of less than 8 carbon atoms from such solution at a temperature below the decomposition temperature of said zinc salt until a viscous material results; and (c) reacting with the resulting material from 0.1 to 2.5 moles of water per mole of zinc salt present.

10. The process of claim 9 further characterized in that said phenolic compound contains at least one polyisobutylene substituent having an average of from 10 to 60 carbon atoms.

11. A method for producing a fluid, oil-soluble mixture of magnesium and zinc salts of a phenolic compound, which phenolic compound contains a total of at least 10 carbon atoms and less than 60 aliphatic carbon atoms, which process comprises the steps of : (a) preparing a solution of the magnesium and zinc salts of the phenolic compound in an alcohol of less than 8 carbon atoms; (b) evaporating a substantial proportion of the alcohol of less than 8 carbon atoms from such solution at a temperature below the decomposition temperature of said magnesium and zinc salts until a viscous material results; and (c) reacting with the resulting material from 0.1 to 2.5 moles of water per mole of magnesium and zinc salt present.

12. The process of claim 11 further characterized in that said phenolic compound contains at least ten aliphatic carbon atoms per benzene nucleus.

13. The process of claim 11 further characterized in that said phenolic compound contains at least one polyisobutylene substituent having an average of from 10 to 60 carbon atoms.

References Cited in the file of this patent

UNITED STATES PATENTS

| 2,252,663 | Reiff | Aug. 12, 1941 |
| 2,621,194 | Balthis | Dec. 9, 1952 |
| 2,621,195 | Haslam | Dec. 9, 1952 |
| 2,666,772 | Boyd | Jan. 19, 1954 |

FOREIGN PATENTS

| 555,053 | Great Britain | Aug. 3, 1943 |

OTHER REFERENCES

Gas. Chim. Ital., vol 74, pages 13–19 (1944).